(12) United States Patent
Doll et al.

(10) Patent No.: US 12,104,259 B2
(45) Date of Patent: Oct. 1, 2024

(54) EROSIVE WEAR AND CORROSION RESISTANT COATINGS INCLUDING METAL CARBIDE, METAL BORIDE, METAL NITRIDE, AND CORRESPONDING METHODS

(71) Applicants: Gary L. Doll, North Canton, OH (US); Brandon L. Strahin, Diamond, OH (US)

(72) Inventors: Gary L. Doll, North Canton, OH (US); Brandon L. Strahin, Diamond, OH (US)

(73) Assignee: THE UNIVERSITY OF AKRON, Akron, OH (US)

( * ) Notice: Subject to any disclaimer, the term of this patent is extended or adjusted under 35 U.S.C. 154(b) by 179 days.

(21) Appl. No.: 17/262,374

(22) PCT Filed: Jul. 23, 2019

(86) PCT No.: PCT/US2019/042962
§ 371 (c)(1),
(2) Date: Jan. 22, 2021

(87) PCT Pub. No.: WO2020/023469
PCT Pub. Date: Jan. 30, 2020

(65) Prior Publication Data
US 2021/0292881 A1 Sep. 23, 2021

Related U.S. Application Data

(60) Provisional application No. 62/702,479, filed on Jul. 24, 2018.

(51) Int. Cl.
*C23C 8/40* (2006.01)
*C09D 1/00* (2006.01)

(52) U.S. Cl.
CPC . *C23C 8/40* (2013.01); *C09D 1/00* (2013.01)

(58) Field of Classification Search
None
See application file for complete search history.

(56) References Cited

U.S. PATENT DOCUMENTS

| 4,461,656 A | 7/1984 | Ross |
| 5,851,313 A | 12/1998 | Milam |

(Continued)

FOREIGN PATENT DOCUMENTS

| CA | 2640937 | 9/2007 | |
| EP | 0252479 | * 1/1988 | ............ C23C 16/30 |

(Continued)

OTHER PUBLICATIONS

Strahin, et al. Properties and Tribological Performance of Vanadium Carbide Coatings on AISI 52100 Steel Deposited by Thermoreactive Diffusion. JOM. vol. 69. No. 7. May 18, 2017; DOI: 10.1007/si 1837-017-2370-2; abstract; pp. 1160-1163, figure 1.

(Continued)

*Primary Examiner* — Lois L Zheng
(74) *Attorney, Agent, or Firm* — RENNER KENNER GREIVE BOBAK TAYLOR & WEBER

(57) ABSTRACT

A method of coating an alloy substrate includes providing an alloy substrate that includes less than 0.3 wt. % of diffusible elements; introducing one or more diffusible elements into the alloy substrate to thereby form a diffusible-element-containing alloy substrate; and introducing the diffusible-element-containing alloy substrate to a material reactive with the one or more diffusible elements.

17 Claims, 1 Drawing Sheet

(56) References Cited

U.S. PATENT DOCUMENTS

| | | | |
|---|---|---|---|
| 8,540,825 B2 | | 9/2013 | Hwang et al. |
| 9,212,416 B2 | | 12/2015 | Williams et al. |
| 2003/0155045 A1 | | 8/2003 | Williams |
| 2009/0293993 A1 | | 12/2009 | Zlatev et al. |
| 2016/0083831 A1 | | 3/2016 | Williams et al. |
| 2017/0283934 A1 | * | 10/2017 | Fujikawa ................ C23C 10/02 |

FOREIGN PATENT DOCUMENTS

| | | | | |
|---|---|---|---|---|
| JP | 2000-144373 | * | 5/2000 | ............. C23C 10/26 |
| JP | 2010-222598 | * | 10/2010 | ............. C23C 10/18 |
| WO | 1992014863 | | 9/1992 | |
| WO | 1994000617 | | 1/1994 | |
| WO | WO 2007/084961 | * | 7/2007 | ............... A61F 2/36 |
| WO | WO 2016-056491 | * | 4/2016 | ............. C23C 12/00 |

OTHER PUBLICATIONS

Heuer et al., "Low Temperature Carburization.", Encyclopedia of Tribology, Springer US, Aug. 15, 2013.

Aghaie-Khafri et al., "Vanadium carbide coatings on die steel deposited by the thermo-reactive diffusion technique.", Journal of Physics and Chemistry of Solids 69, 10 (2008): 2465-2470.

Sen. Saduman, "A study on kinetics of CrxC-coated high-chromium steel by thermo-reactive diffusion technique." Vacuum 79. 1 (2005): 63-70.

King et al., "Cr(N,C) diffusion coating formation on pre-nitrocarburised H13 tool steel.", Surface and Coatings Technology 179 (2004) 18-26.

* cited by examiner

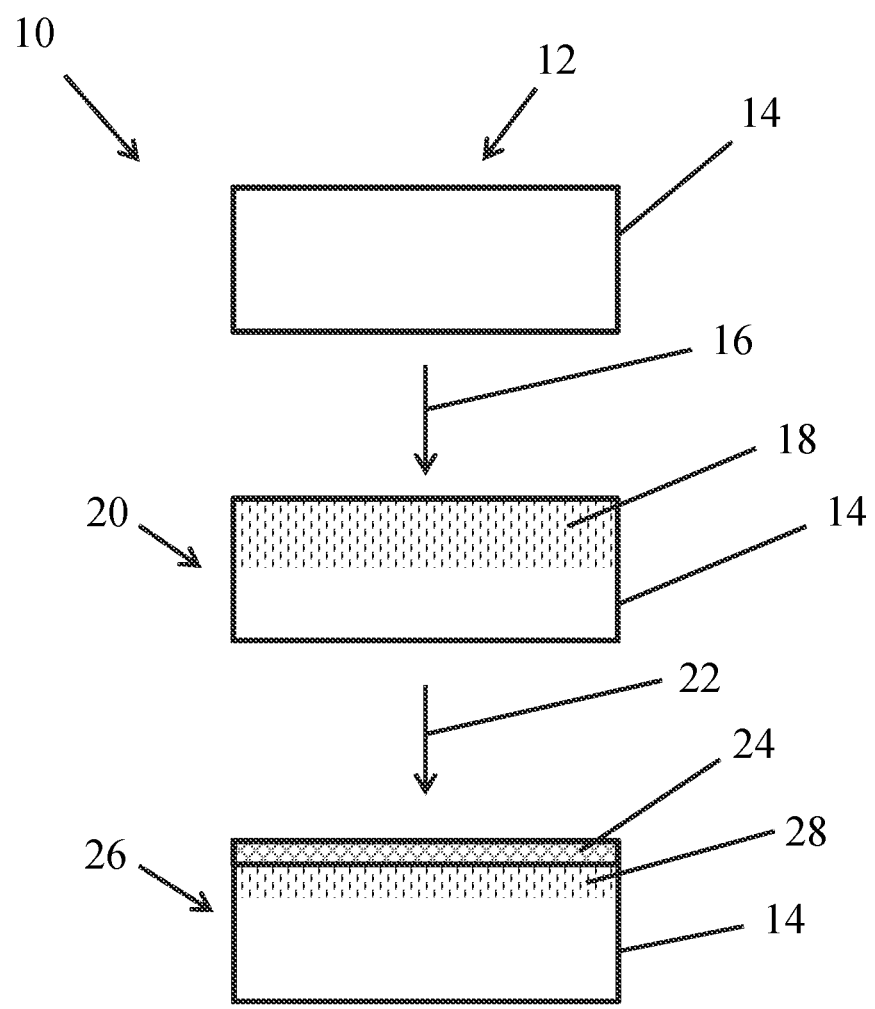

EROSIVE WEAR AND CORROSION RESISTANT COATINGS INCLUDING METAL CARBIDE, METAL BORIDE, METAL NITRIDE, AND CORRESPONDING METHODS

CROSS-REFERENCE TO RELATED APPLICATION

This application claims the benefit of U.S. Provisional Patent Application No. 62/702,479 filed on Jul. 24, 2018, the contents of which are incorporated herein by reference.

FIELD OF THE INVENTION

The present invention generally relates to erosive wear and corrosion resistant coatings for alloys and methods for preparing the coatings.

BACKGROUND OF THE INVENTION

Some corrosion-resistant coatings, such as chromium synthesized by electrodeposition, do not also have sufficient resistance to erosive wear. To be resistant to erosive wear, a coating generally must be hard and metallurgically bonded to the substrate on which the coating is located.

Other coatings, such as tungsten carbide produced by thermal spraying, do have sufficient resistance to erosive wear, but do not have sufficient resistance to corrosion. To have sufficient corrosion resistance, a coating must not have voids or low energy diffusion pathways into which corrosive elements may enter.

There remains a technological need to provide coatings, such as for structural alloys, having sufficient resistance to both erosive wear and corrosion.

SUMMARY OF THE INVENTION

A first embodiment provides a method of coating an alloy substrate, the method comprising steps of providing an alloy substrate that includes less than 0.3 wt. % of diffusible elements; introducing one or more diffusible elements into the alloy substrate to thereby form a diffusible-element-containing alloy substrate; and introducing the diffusible-element-containing alloy substrate to a material reactive with the one or more diffusible elements, wherein the step of introducing the diffusible-element-containing alloy substrate to a material reactive with the one or more diffusible elements includes subjecting the diffusible-element-containing alloy substrate to an environment where the one or more diffusible elements will at least partially diffuse from the diffusible-element-containing alloy substrate to thereby react with the material reactive with the diffusible element to form a coating layer including the reaction product thereof, wherein the coating layer is a distinct layer from the diffusible-element-containing alloy substrate.

A second embodiment provides a method as in any of the above embodiments, wherein the step of introducing one or more diffusible elements into the alloy substrate occurs at a temperature of from about 750° C. to about 950° C.

A third embodiment provides a method as in any of the above embodiments, wherein the step of introducing the diffusible-element-containing alloy substrate to a material reactive with the one or more diffusible elements occurs at a temperature of from about 750° C. to about 950° C.

A fourth embodiment provides a method as in any of the above embodiments, wherein the coating layer has a thickness of from 3 μm to 20 μm.

A fifth embodiment provides a method as in any of the above embodiments, wherein the one or more diffusible elements is selected from the group consisting of carbon, nitrogen, boron, oxygen, and combinations thereof.

A sixth embodiment provides a method as in any of the above embodiments, wherein the diffusible elements of which the alloy substrate includes less than 0.3 wt. % is selected from the group consisting of carbon, nitrogen, boron, oxygen, and combinations thereof.

A seventh embodiment provides a method as in any of the above embodiments, wherein the step of introducing one or more diffusible elements into the alloy substrate occurs in a salt bath.

An eighth embodiment provides a method as in any of the above embodiments, wherein the step of introducing one or more diffusible elements into the alloy substrate occurs by packing the alloy substrate with a composition containing the one or more diffusible elements.

A ninth embodiment provides a method as in any of the above embodiments, wherein the step of introducing the diffusible-element-containing alloy substrate to a material reactive with the one or more diffusible elements occurs in a salt bath.

A tenth embodiment provides a method as in any of the above embodiments, wherein the step of introducing the diffusible-element-containing alloy substrate to a material reactive with the one or more diffusible elements occurs in a fluidized bed.

A eleventh embodiment provides a method as in any of the above embodiments, wherein the coating layer has a hardness of from about 1500 HV to about 2500 HV.

A twelfth embodiment provides a method as in any of the above embodiments, wherein the coating layer has a hardness of from about 1700 HV to about 2300 HV.

A thirteenth embodiment provides a method as in any of the above embodiments, wherein the alloy substrate is made of an alloy selected from the group consisting of stainless steel, nickel-based alloys, austenitic nickel-chromium-based superalloys, titanium-based alloys, nickel-titanium alloys, cobalt alloys, titanium aluminide alloys, and tungsten alloys.

A fourteenth embodiment provides a method as in any of the above embodiments, wherein the alloy substrate is made of Type 410 stainless steel.

A fifteenth embodiment provides a method as in any of the above embodiments, wherein the alloy substrate is made of Inconel 718.

A sixteenth embodiment provides a method as in any of the above embodiments, wherein the coating layer has a thickness of from 2.5 μm to 5 μm.

A seventeenth embodiment provides a method as in any of the above embodiments, wherein the coating layer includes about 98 wt. % of the reaction product.

An eighteenth second embodiment provides a method as in any of the above embodiments, wherein the coating layer includes about 100 wt. % of the reaction product.

A nineteenth embodiment provides a coated alloy substrate made by any of the above embodiments.

BRIEF DESCRIPTION OF THE DRAWINGS

Advantages of the present invention will become better understood with regard to the following description, appended claims, and accompanying drawing wherein:

The FIGURE is a schematic of a method according to one or more embodiments of the invention.

DETAILED DESCRIPTION OF ILLUSTRATIVE EMBODIMENTS

Embodiments of the present invention are based, at least in part, on corrosion and erosion resistant coatings for alloys and methods for preparing the coatings. Methods for preparing corrosion and erosion resistant coatings include first introducing one or more diffusible elements into an alloy substrate. Prior to the step of introducing the diffusible element, the alloy substrate may be devoid or substantially devoid of diffusible elements. The step of introducing the diffusible element into an alloy substrate may be accomplished by a variety of techniques and generally includes heating a diffusible material and the alloy substrate at a temperature and time sufficient to diffuse the diffusible element into the alloy substrate. This step forms a diffusible-element-containing alloy substrate. Following the step of introducing the diffusible element to form the diffusible-element-containing alloy substrate, the diffusible-element-containing alloy substrate is introduced to a material reactive with the diffusible element. This generally includes subjecting the diffusible-element-containing alloy substrate to an environment where the diffusible element will at least partially diffuse from the diffusible-element-containing alloy substrate to react with the material reactive with the diffusible element. This reaction between the diffusible element and the material reactive with the diffusible element forms a coating layer formed of the reaction product. Advantageously, the coating layer provides both sufficient corrosion resistance and erosive wear resistance for the alloy substrate.

With reference to the FIGURE, a method 10 for providing an erosive wear and corrosion resistant coating on an alloy substrate includes a first step 12 of providing an alloy substrate 14. As will be discussed further herein, in one or more embodiments, alloy substrate 14 may be devoid or substantially devoid of diffusible elements.

Method 10 includes a next step 16 of introducing one or more diffusible elements into alloy substrate 14. As will be further discussed herein, step 16 may be accomplished by a variety of techniques and generally includes heating a diffusible material, which may also be referred to as diffusible-element-containing material, and alloy substrate 14 at a temperature and time sufficient to diffuse the one or more diffusible elements into alloy substrate 14 to thereby form a diffusible-element layer 18 of the diffusible element within alloy substrate 14. Alloy substrate 14 containing diffusible-element layer 18 therewithin may be described as a diffusible-element-containing alloy substrate 20, which is shown in a cross-sectional schematic view in the FIGURE. It should be appreciated that diffusible-element layer 18 includes the one or more diffusible elements diffused within the material of alloy substrate 14.

Method 10 includes a next step 22 of introducing to diffusible-element-containing alloy substrate 20 one or more materials reactive with the one or more diffusible elements of diffusible-element layer 18. Step 22 includes subjecting diffusible-element-containing alloy substrate 20 to an environment where the one or more diffusible elements of diffusible-element layer 18 will at least partially diffuse from diffusible-element-containing alloy substrate 20. This at least partial diffusion of the one or more diffusible elements of diffusible-element layer 18 from diffusible-element-containing alloy substrate 20 enables reaction of the one or more diffusible elements with the one or more materials reactive with the one or more diffusible elements. This reaction forms a coating layer 24 made from the reaction product to thereby form a coated alloy substrate 26, which is shown in a cross-sectional schematic view in the FIGURE.

Coating layer 24 may be considered as a distinct layer from alloy substrate 14. That is, the reaction product of coating layer 24 is no longer diffused within the material of alloy substrate 14. Advantageously, and as will be further described herein, coating layer 24 provides both sufficient corrosion resistance and sufficient erosive wear resistance for coated alloy substrate 26.

In one or more embodiments, where there is only partial diffusion of the one or more diffusible elements of diffusible-element layer 18 from diffusible-element-containing alloy substrate 20, a residual diffusible-element layer 28 remains from diffusible-element layer 18. Residual diffusible-element layer 28 includes the one or more diffusible elements diffused within the material of alloy substrate 14. In other embodiments, where there is complete or substantially complete diffusion of the one or more diffusible elements of diffusible-element layer 18 from diffusible-element-containing alloy substrate 20, residual diffusible-element layer 28 may not be present.

As suggested above, alloy substrate 14 may be devoid or substantially devoid of diffusible elements prior to step 16 of introducing one or more diffusible elements. Exemplary diffusible elements include carbon (C), nitrogen (N), boron (B), and oxygen (O). For purposes of this specification, it should be appreciated that embodiments where alloy substrate 14 may be devoid or substantially devoid of diffusible elements refers to those elements that are present in sufficient amounts and/or have sufficient diffusibility as to form a technologically useful coating layer 24. That is, certain alloys suitable for alloy substrate 14 may include these elements (e.g. C, N, B, O) in certain relatively small amounts, though with these elements having insufficient or low diffusibility from the alloys as to form a technologically useful coating layer 24. For purposes of this specification, alloy substrate 14 being substantially devoid of diffusible elements may be defined as an amount of diffusible elements less than that amount that would otherwise form a distinct coating layer (e.g. layer 24) of technologically useful thickness if subjected to a step similar to step 22 described elsewhere herein.

In one or more embodiments, alloy substrate 14 includes less than 0.5 wt. %, in other embodiments, less than 0.4 wt. %, in other embodiments, less than 0.3 wt. %, in other embodiments, less than 0.25 wt. %, in other embodiments, less than 0.1 wt. %, and in other embodiments, about 0 wt. %, diffusible elements (e.g. C, N, B, O) prior to step 16 of introducing one or more diffusible elements. For purposes of this specification, any range or endpoint disclosed herein with the term "about" may also describe the particular range or endpoint.

Any suitable alloy may be used for alloy substrate 14. The alloy for alloy substrate 14 may be chosen in connection with particular one or more diffusible elements such that the one or more diffusible elements will sufficiently diffuse into alloy substrate during step 16 of introducing one or more diffusible elements, and then also the one or more diffusible elements will sufficiently diffuse from diffusible-element-containing alloy substrate 20 during step 22. Combinations of certain alloys with certain one or more diffusible elements would allow sufficient diffusion of the one or more diffusible elements into the alloy, but then would not allow sufficient diffusion from the diffusible-element-containing alloy in order to form a coating layer. One of skill in the art will generally know how to make the selections of the alloy for alloy substrate 14 with the one or more diffusible elements at least based on thermodynamically favorable conditions, such as with respect to the Gibbs free energy, for subsequent step 22. That is, thermodynamically favorable conditions, such as lower Gibbs free energy, are generally required for step 22 in order to allow sufficient diffusion of the one or more diffusible elements from diffusible-element-containing alloy substrate 20 in order to form coating layer 24. For example, nitrogen may sufficiently diffuse into titanium-containing alloys, but may not subsequently sufficiently diffuse from the nitrogen-containing-titanium-containing alloy.

Exemplary alloys for alloy substrate 14 include stainless steel, nickel-based alloys, austenitic nickel-chromium-based superalloys, titanium-based alloys, nickel-titanium alloys, cobalt alloys, titanium aluminide alloys, and tungsten alloys. An exemplary stainless steel is Type 410 stainless steel. Exemplary nickel-based alloys include those generally known by the tradename Monel. Exemplary austenitic nickel-chromium-based superalloys include those generally known by the tradename Inconel. An exemplary Inconel material is Inconel 718. Exemplary nickel-titanium alloys include those generally known by the tradename Nitinol.

Various suitable compositions for suitable alloys for alloy substrate 14 will be generally known to one skilled in the art. In one or more embodiments, alloy substrate 14 includes at least 40 wt. %, in other embodiments, at least 50 wt. %, and in other embodiments, at least 60 wt. %, of the primary metal or metals (e.g. iron for stainless steel, nickel for nickel-based alloys). One skilled in the art generally appreciates that the various suitable alloys may include a variety of secondary elements in suitable compositions, where useful secondary elements include chromium (Cr), nickel (Ni), iron (Fe), silicon (Si), manganese (Mn), molybdenum (Mo), niobium (Nb), tantalum (Ta), cobalt (Co), copper (Cu), aluminum (Al), titanium (Ti), carbon (C), sulfur (S), phosphorous (P), boron (B), tungsten (W), vanadium (V), and zirconium (Zr). As generally known to one skilled in the art, certain metals may serve as primary metals for certain alloys and as secondary metals for other alloys.

As suggested above, step 16 of introducing one or more diffusible elements into alloy substrate 14 may be accomplished by a variety of techniques and generally includes heating a diffusible material and alloy substrate 14 at a temperature and time sufficient to diffuse the one or more diffusible elements into alloy substrate 14 to thereby form a diffusible-element layer 18 of the diffusible element within alloy substrate 14. As suggested above, the one or more diffusible elements may be selected based on the ability to diffuse into alloy substrate 14 and based on thermodynamically favorable conditions, such as with respect to the Gibbs free energy, for subsequent step 22.

As part of step 16, a diffusible-material-containing composition may be provided that includes the diffusible material. The diffusible material then forms the one or more diffusible elements upon being subjected to sufficient time and temperature. The diffusible material may be a two-component compound containing the one or more diffusible elements as one of the components. The diffusible-material-containing composition may further include a carrier, such as anhydrous borax, for the purpose of providing mobility for the composition. In one or more embodiments, the carrier (e.g. anhydrous borax) may also serve as a reducing agent. In embodiments where the carrier is not a reducing agent, then the diffusible-material-containing composition may include a reducing agent. The diffusible-material-containing composition may further include refractory material as a heat resistant material.

Exemplary elements for the one or more diffusible elements include carbon, nitrogen, boron, oxygen, and combinations thereof.

In embodiments where the one or more diffusible elements include boron, step 16 may be described as a step of boriding or boronizing. This includes diffusing boron atoms into alloy substrate 14 to form diffusible-element layer 18.

Boriding may be accomplished a variety of suitable techniques. Boriding generally includes packing the alloy substrate with a boriding mixture and heating the substrate and mixture. A boriding mixture may include boron carbide powder, with other materials, such as anhydrous borax. A boriding step produces a boron potential. In one or more embodiments, a boriding mixture may include iron (Fe), which will be converted to iron boride, and which may be in two phases: FeB and $Fe_2B$.

In embodiments where the one or more diffusible elements include carbon, step 16 may be described as a step of carburizing or carburization. This includes diffusing carbon atoms into alloy substrate 14 to form diffusible-element layer 18.

Carburization may be accomplished a variety of suitable techniques. Carburization generally includes packing the alloy substrate with a carburization mixture and heating the substrate and mixture. A carburization mixture may include a carbon-bearing material, such as charcoal or carbon monoxide, with other suitable materials, such as methane and acetylene. A carburization step produces a carbon potential.

In embodiments where the one or more diffusible elements include nitrogen, step 16 may be described as a step of nitriding. This includes diffusing nitrogen atoms into alloy substrate 14 to form diffusible-element layer 18.

Nitriding may be accomplished a variety of suitable techniques. Nitriding may include one or more of gas nitriding, salt bath nitriding, and plasma nitriding. Gas nitriding generally includes a nitrogen rich gas, such as ammonia, nitrous oxide, and nitrogen, as the nitrogen-bearing material. Salt bath nitriding generally includes a nitrogen-containing salt, such as cyanate, as the nitrogen-bearing material. Plasma nitriding generally includes adjusting the gas ionized state of a gas, such as pure nitrogen, to form plasma as the nitrogen-bearing material.

In embodiments where the one or more diffusible elements include carbon and nitrogen, step 16 may be described as a step of nitrocarburizing or carbonitriding. This includes diffusing carbon and nitrogen atoms into alloy substrate 14 to form diffusible-element layer 18.

Nitrocarburizing may be accomplished a variety of suitable techniques. A step of nitrocarburizing may be ferritic nitrocarburizing. Ferritic nitrocarburizing may be one or more of gaseous, salt bath, plasma, and fluidized-bed. Other aspects of nitrocarburizing and ferritic nitrocarburizing may be generally known to one skilled in the art.

Carbonitriding may be accomplished a variety of suitable techniques. Other aspects of carbonitriding may be generally known to one skilled in the art.

In one or more embodiments, step 16 may be a step of ion implantation, which generally includes utilizing a particle accelerator to accelerate ions of the one or more diffusible elements into alloy substrate 14.

The diffusible-material-containing composition may be characterized by the composition thereof. The diffusible-material-containing composition may vary based on the material and shape of alloy substrate 14.

In one or more embodiments, the diffusible-material-containing composition includes from about 1 wt. % to about 95 wt. %, in other embodiments, from about 5 wt. % to about 30 wt. %, in other embodiments, from about 15 wt. % to about 25 wt. %, in other embodiments, from about 10 wt. % to about 40 wt. %, in other embodiments, from about 60 wt. % to about 90 wt. %, and in other embodiments, from about 70 wt. % to about 80 wt. 00 diffusible material (e.g. boron carbide).

In one or more embodiments, the diffusible-material-containing composition includes from about 1 wt. % to about 95 wt. %, in other embodiments, from about 5 wt. % to about 30 wt. %, in other embodiments, from about 15 wt. % to about 25 wt. %, in other embodiments, from about 20 wt. % to about 30 wt. %, in other embodiments, from about 10 wt. % to about 40 wt. %, in other embodiments, from about 60 wt. % to about 90 wt. %, and in other embodiments, from about 70 wt. % to about 80 wt. %, carrier (e.g. anhydrous borax).

In one or more embodiments, step 16 of introducing one or more diffusible elements into alloy substrate 14 may occur for a predetermined amount of time. The suitable time may depend on the material of alloy substrate 14 and the temperature utilized for step 16. In one or more embodiments, step 16 of introducing one or more diffusible elements into alloy substrate 14 occurs from about 5 minutes to about 96 hours, in other embodiments, from about 18 hours to about 24 hours, in other embodiments, from about 20 hours to about 22 hours, in other embodiments, from about 0.5 hours to about 5 hours, and in other embodiments, from about 1 hours to about 3 hours.

In one or more embodiments, step 16 of introducing one or more diffusible elements into alloy substrate 14 may occur at a predetermined temperature. The suitable temperature may depend on eutectics, diffusion rate, and whether the material of alloy substrate 14 is heat treatable. In one or more embodiments, step 16 of introducing one or more diffusible elements into alloy substrate 14 occurs at from about 550° C. to about 950° C., in other embodiments, at from about 550° C. to about 650° C., and in other embodiments, at from about 750° C. to about 950° C. In one or more embodiments, step 16 of introducing one or more diffusible elements into alloy substrate 14 occurs at less than 1200° C. In one or more embodiments, step 16 of introducing one or more diffusible elements into alloy substrate 14 occurs at greater than 300° C., in other embodiments, greater than 750° C., and in other embodiments, greater than 850° C.

In one or more embodiments, diffusible-element layer 18 has a thickness of about 25 µm, and in other embodiments, about 30 µm. In one or more embodiments, diffusible-element layer 18 has a thickness of from about 10 to about 40 µm, in other embodiments, from about 15 to about 35 µm, and in other embodiments, from about 20 to about 30 µm. In one or more embodiments, diffusible-element layer 18 has a thickness of 10 µm or more, in other embodiments, 15 µm or more, and in other embodiments, 20 µm or more. In these or other embodiments, diffusible-element layer 18 has a thickness of 40 µm or less, in other embodiments 35 µm or less, and in other embodiments 30 µm or less. The thickness of diffusible-element layer 18 can be adjusted based on the time and temperature of step 16.

As suggested above, step 22 of introducing to diffusible-element-containing alloy substrate 20 one or more materials reactive with the one or more diffusible elements of diffusible-element layer 18 may be accomplished by a variety of techniques. Step 22 generally includes subjecting diffusible-element-containing alloy substrate 20 to an environment where the one or more diffusible elements of diffusible-element layer 18 will at least partially diffuse from diffusible-element-containing alloy substrate 20. Step 22 may be a thermoreactive diffusion step, which may utilize a salt bath or a fluidized bed. Aspects of step ability may be chosen based on the ability to reduce a compound in order to provide the one or more materials reactive with the one or more diffusible elements of diffusible-element layer 18.

Based on the one or more diffusible elements used in step 16, step 22 may form a variety of suitable coating layers 24, such as metal carbide, metal boride (e.g. vanadium boride), and metal nitride. Coating layer 24 will be metallurgically bonded to alloy substrate 14, and will be absent of voids and low energy diffusion channels, in order to provide suitable resistance to corrosion and erosive wear.

Thermoreactive diffusion (TRD) generally describes a process whereby heat and a particular electrochemical environment causes the one or more diffusible elements of diffusible-element layer 18 to diffuse from alloy substrate. The diffused elements then react with reactive materials provided by a composition, as discussed above, to form a coating layer. Thermoreactive diffusion may be a multi-stage process utilizing a sub-step of pre-heating, to prevent thermal shock, prior to a sub-step of introducing the reactive-material-containing composition while at a predetermined temperature as discussed above. Thermoreactive diffusion may further include a sub-step of quenching the heated substrate, which may be achieved by water quenching. Where necessary, thermoreactive diffusion may further include a sub-step of cleaning the substrate, which may be achieved by ultrasound or air. Where a water quench is utilized, the water quench may also provide a cleaning function. Thermoreactive diffusion may further include a sub-step of post-heat-treating and/or post-coating polishing.

As part of step 22, the one or more materials reactive with the one or more diffusible elements of diffusible-element layer 18 may be provided in a composition, such as a salt bath composition or fluidized bed composition, that includes a reactive-material-containing compound. The reactive-material-containing compound may then form the one or more materials reactive with the one or more diffusible elements of diffusible-element layer 18 upon being subjected to sufficient time and temperature. The one or more materials reactive with the one or more diffusible elements may include vanadium, chromium, aluminum, niobium, tantalum, other suitable materials, and combinations thereof.

Where the composition of step 22 is a salt bath composition, the reactive-material-containing compound may be an oxide of the one or more materials reactive with the one or more diffusible elements of diffusible-element layer 18. Exemplary oxides include vanadium pentoxide, niobium oxide, tantalum oxide, and chromium oxide. The salt bath composition may further include a carrier, such as anhydrous borax, for the purpose of providing mobility for the composition. The salt bath composition may further include a reducing agent and viscosity increasing agent, which may be the same material. The reducing agent can reduce the oxide in order to provide the reactive material. An exemplary reducing agent and viscosity increasing agent is boron carbide.

In one or more embodiments where step 22 includes the use of a salt bath, the composition for step 22 includes from about 1 wt. % to about 95 wt. %, in other embodiments, from about 5 wt. % to about 30 wt. %, in other embodiments, from about 15 wt. % to about 25 wt. %, in other embodiments, from about 20 wt. % to about 30 wt. %, in other embodiments, from about 10 wt. % to about 40 wt. %, in other embodiments, from about 60 wt. % to about 90 wt. %, and in other embodiments, from about 70 wt. % to about 80 wt. %, carrier (e.g. anhydrous borax).

In one or more embodiments where step 22 includes the use of a salt bath, the composition for step 22 includes from about 1 wt. % to about 35 wt. %, in other embodiments, from about 5 wt. % to about 30 wt. %, in other embodiments, from about 10 wt. % to about 25 wt. %, in other embodiments, from about 15 wt. % to about 25 wt. %, and in other embodiments, from about 15 wt. % to about 20 wt. %, reactive material (e.g. vanadium pentoxide).

In one or more embodiments where step 22 includes the use of a salt bath, the composition for step 22 includes from about 1 wt. % to about 15 wt. %, in other embodiments, from about 1 wt. % to about 10 wt. %, in other embodiments, from about 3 wt. % to about 7 wt. %, and in other embodiments, from about 4 wt. % to about 6 wt. %, reducing agent/viscosity increasing agent (e.g. boron carbide). The amount of reducing agent/viscosity increasing agent may be based on a ratio with respect to the reactive material, which may be about 1 part reducing agent/viscosity increasing agent to 4 parts reactive material, in other embodiments, about 1 part reducing agent/viscosity increasing agent to 3 parts reactive material, and in other embodiments, about 1 part reducing agent/viscosity increasing agent to 5 parts reactive material.

Where the composition of step 22 is a fluidized bed composition, the fluidized bed composition may include the reactive material in the form of powder (e.g. ferrovanadium powder). The fluidized bed composition may further include an inert carrier powder (e.g. alumina powder) to keep the reactive powder equally distributed. The fluidized bed may also include a fluidizing gas to achieve the gives fluid properties. The fluidizing gas may further include an activator, such as hydrogen chloride or any halogen, for catalyzing the reaction.

In one or more embodiments where step 22 includes the use of a fluidized bed, the composition for step 22 includes from about 1 wt. % to about 95 wt. %, in other embodiments, from about 5 wt. % to about 30 wt. %, in other embodiments, from about 15 wt. % to about 25 wt. %, in other embodiments, from about 10 wt. % to about 40 wt. %, in other embodiments, from about 60 wt. % to about 90 wt. %, and in other embodiments, from about 70 wt. % to about 80 wt. %, reactive material powder (e.g. ferrovanadium powder).

In one or more embodiments where step 22 includes the use of a fluidized bed, the composition for step 22 includes from about 1 wt. % to about 95 wt. %, in other embodiments, from about 5 wt. % to about 30 wt. %, in other embodiments, from about 15 wt. % to about 25 wt. %, in other embodiments, from about 10 wt. % to about 40 wt. %, in other embodiments, from about 60 wt. % to about 90 wt. %, and in other embodiments, from about 70 wt. % to about 80 wt. %, inert carrier powder (e.g. alumina powder).

In one or more embodiments where step 22 includes the use of a fluidized bed, the fluidizing gas for step 22 includes from about 0.1 vol. % to about 3 vol. %, in other embodiments, from about 0.5 vol. % to about 2 vol. %, and in other embodiments, from about 0.7 vol. % to about 1.5 vol. %, activator.

In one or more embodiments, step 22 may occur for a predetermined amount of time. The suitable time may depend on the material of alloy substrate 14 and the temperature utilized for step 22. In one or more embodiments, step 22 occurs from about 5 minutes to about 96 hours, in other embodiments, from about 18 hours to about 24 hours, in other embodiments, from about 20 hours to about 22 hours, in other embodiments, from about 0.5 hours to about 5 hours, and in other embodiments, from about 1 hours to about 3 hours.

In one or more embodiments, step 22 may occur at a predetermined temperature. The suitable temperature may depend on eutectics and diffusion rate. In one or more embodiments, step 22 occurs at from about 550° C. to about 950° C., in other embodiments, at from about 550° C. to about 650° C., and in other embodiments, at from about 750° C. to about 950° C. In one or more embodiments, step 22 occurs at less than 1200° C. In one or more embodiments, step 22 occurs at greater than 300° C., in other embodiments, greater than 750° C., and in other embodiments, greater than 850° C.

In one or more embodiments, coating layer 24 has a thickness of about 2.5 µm, and in other embodiments, about 5 µm. In one or more embodiments, coating layer 24 has a thickness of from 2 to 10 µm, in other embodiments, from 2 to 7 µm, and in other embodiments, from 2.5 to 5 µm. In one or more embodiments, coating layer 24 has a thickness of 2 µm or more, in other embodiments, 3 µm or more, in other embodiments, 5 µm or more, and in other embodiments, 10 µm or more. In these or other embodiments, coating layer 24 has a thickness of 20 µm or less, in other embodiments 15 µm or less, in other embodiments 10 µm or less, and in other embodiments 8 µm or less. The thickness of coating layer 24 can be adjusted based on the time and temperature of step 22.

Where residual diffusible-element layer 28 remains, in one or more embodiments, residual diffusible-element layer 28 has a thickness of about 20 µm, and in other embodiments, about 25 am. In one or more embodiments, residual diffusible-element layer 28 has a thickness of from 10 to 30 am, in other embodiments, from 15 to 25 am, and in other embodiments, from 17 to 23 am. In one or more embodiments, residual diffusible-element layer 28 has a thickness of 20 am or less, in other embodiments, 15 µm or less, in other embodiments 10 µm or less, in other embodiments, 5 µm or less, in other embodiments, 1 µm or less, and in other embodiments, about 0 µm. The thickness of residual diffusible-element layer 28 can be adjusted based on the time and temperature of step 22.

Other aspects of step 22 may be disclosed in U.S. Pat. Nos. 4,440,581; and 4,778,540, which are each incorporated herein by reference.

Coating layer 24 may be defined by the composition thereof. In one or more embodiments, layer 24 includes from about 95 wt. % to about 100 wt. %, in other embodiments, from about 98 wt. % to about 100 wt. %, in other embodiments, from about 95 wt. % to about 99 wt. %, and in other embodiments, from about 98 wt. % to about 99.5 wt. %, of the reaction product from the reaction between the one or more diffusible elements and the one or more materials reactive with the one or more diffusible element. In one or more embodiments, layer 24 includes about 98 wt. %, in other embodiments, about 99 wt. %, in other embodiments, about 99.5 wt. %, and in other embodiments, about 100 wt. %, of the reaction product from the reaction between the one or more diffusible elements and the one or more materials reactive with the one or more diffusible element.

To have sufficient corrosion resistance, in one or more embodiments, coating layer 24 may be devoid of or substantially devoid of voids or low energy diffusion pathways into which corrosive elements may enter. Scanning electron microscopy may be used to analyze the presence or absence of voids or low energy diffusion pathways.

To have sufficient erosive wear resistance, in one or more embodiments, coating layer 24 may be relatively hard and metallurgically bonded to alloy substrate 14. In one or more embodiments, coating layer 24 has a hardness of from about 1200 HV to about 2800 HV, in other embodiments, from about 1500 HV to about 2500 HV, and in other embodiments, from about 1700 HV to about 2300 HV. In one or more embodiments, coating layer 24 has a hardness of 1500 HV or more, in other embodiments, 1800 HV or more, and in other embodiments, 2200 HV or more. Sufficient metallurgical bonding may be determined based on generally known adhesion tests.

In one or more embodiments, coated alloy substrate 26 with coating layer 24 may find particularly useful applications in one or more of aerospace, construction, mining, and agricultural technologies.

EXAMPLES

Example 1

A substrate of Inconel 718 was provided. The substrate of Inconel 718 was boronized at 850° C. for 21 hours in 75 wt. % boron carbide and 25 wt. % anhydrous borax to produce a boron potential. The boron diffused into the substrate of Inconel 718. Then the substrate having the diffused boron was introduced to a salt bath of 75 wt. % anhydrous borax, 20 wt. % vanadium pentoxide, and 5 wt. % boron carbide at 850° C. for 2 hours in order to cause at least some of the diffused boron to diffuse from the Inconel 718 substrate to react with the vanadium of the salt bath. This produced a layer of vanadium boride that was 2.5 microns thick. A residual boronized sublayer 20 microns thick remained below the layer of vanadium boride and within the Inconel 718 substrate. The layer of vanadium boride had a hardness of 1800 HV and a gradient was observed.

Comparative Example 1

In a similar comparative example that did not include the first step of boronizing the Iconel 718 substrate, no additional layer was formed on or within the Iconel 718 substrate by the vanadium salt bath.

Example 2

A substrate of 410 stainless steel was provided. The 410 stainless steel substrate was subjected to ferritic nitrocarburizing in a salt bath at 590° C. for 1 hour. Then the resulting substrate was vanadized in a fluidized bed that included 80 wt. % alumina powder and 20 wt. % ferrovanadium powder at 850° C. A hydrogen chloride activator at 1 vol. % gas concentration with respect to the total volume of the fluidizing gas was utilized in the fluidized bed. This produced a vanadium carbide nitride (VCN) layer of 2200 HV hardness. The thickness of the VCN layer thickness was 5 microns and a 25 micron total diffusion depth was observed; that is, a 20 micron thick residual layer from the ferritic nitrocarburizing step remained following the vanadizing step.

Comparative Example 2

In a similar comparative example that did not include the pretreatment step of ferritic nitrocarburizing the substrate of 410 stainless steel, a 1 micron thick layer of vanadium carbide (VC) resulted from the step of vanadizing the substrate of 410 stainless steel. This thin layer resulted from the relatively small amount of carbon present in the 410 stainless steel.

What is claimed is:

1. A method of coating an alloy substrate, the method comprising steps of:
providing an alloy substrate that includes about 0 wt. % diffusible elements, wherein the diffusible elements of which the alloy substrate includes about 0 wt. % is selected from the group consisting of carbon, nitrogen, boron, oxygen, and combinations thereof, wherein the step of providing the alloy substrate consists of only the step of providing the alloy substrate;
introducing one or more diffusible elements into the alloy substrate that includes about 0 wt. % diffusible elements to thereby form a diffusible-element-containing alloy substrate having a diffusible-element layer, wherein the one or more diffusible elements include carbon; and
introducing, after completion of the step of introducing the one or more diffusible elements into the alloy substrate that includes the about 0 wt. % diffusible elements to thereby form the diffusible-element-containing alloy substrate, the diffusible-element-containing alloy substrate to a material reactive with the one or more diffusible elements of the diffusible-element layer, wherein the material reactive with the one or more diffusible elements is selected from vanadium, aluminum, niobium, tantalum, and combinations thereof,
wherein the step of introducing the diffusible-element-containing alloy substrate to the material reactive with the one or more diffusible elements includes subjecting the diffusible-element-containing alloy substrate to an environment where the one or more diffusible elements will at least partially diffuse from the diffusible-element layer to thereby react with the material reactive with the one or more diffusible elements to form a coating layer including a reaction product thereof, to thereby form a coated alloy substrate, and
wherein the coating layer is a distinct layer from the diffusible-element-containing alloy substrate.

2. The method of claim 1, wherein the step of introducing one or more diffusible elements into the alloy substrate occurs at a temperature of from about 750° C. to about 950° C.

3. The method of claim 1, wherein the step of introducing the diffusible-element-containing alloy substrate to a material reactive with the one or more diffusible elements occurs at a temperature of from about 550° C. to about 650° C.

4. The method of claim 1, wherein the coating layer has a thickness of from 3 μm to 10 μm.

5. The method of claim 1, wherein the one or more diffusible elements further include nitrogen, boron, oxygen, or combinations thereof.

6. The method of claim 1, wherein the step of introducing one or more diffusible elements into the alloy substrate occurs in a salt bath.

7. The method of claim 1, wherein the step of introducing one or more diffusible elements into the alloy substrate occurs by packing the alloy substrate with a composition containing the one or more diffusible elements.

8. The method of claim 1, wherein the step of introducing the diffusible-element-containing alloy substrate to a material reactive with the one or more diffusible elements occurs in a salt bath.

9. The method of claim 1, wherein the step of introducing the diffusible-element-containing alloy substrate to a material reactive with the one or more diffusible elements occurs in a fluidized bed.

10. The method of claim 1, wherein the coating layer has a hardness of from about 1500 HV to about 2500 HV.

11. The method of claim 1, wherein the coating layer has a hardness of from about 1700 HV to about 2300 HV.

12. The method of claim 1, wherein the alloy substrate is made of an alloy selected from the group consisting of stainless steel, nickel-based alloys, austenitic nickel-chromium-based superalloys, titanium-based alloys, nickel-titanium alloys, cobalt alloys, titanium aluminide alloys, and tungsten alloys.

13. The method of claim 1, wherein the alloy substrate is made of Type 410 stainless steel.

14. The method of claim 1, wherein the coating layer has a thickness of from 2.5 μm to 5 μm.

15. The method of claim 1, wherein the coating layer includes about 98 wt. % of the reaction product.

16. The method of claim 1, wherein the coating layer includes about 100 wt. % of the reaction product.

17. The method of claim 1, wherein the material reactive with the one or more diffusible elements includes vanadium.

\* \* \* \* \*